United States Patent [19]
Bacher et al.

[11] Patent Number: 5,145,463
[45] Date of Patent: * Sep. 8, 1992

[54] THREE PART TORSIONAL DAMPER ASSEMBLY WITH FACING MEANS FOR SETTING CORRECT CIRCUMFERENTIAL RELATIONSHIP OF THE PARTS

[75] Inventors: Michel Bacher, Andilly; Michel Graton, Paris, both of France

[73] Assignee: Valeo, Paris, France

[ * ] Notice: The portion of the term of this patent subsequent to Nov. 13, 2007 has been disclaimed.

[21] Appl. No.: 367,465

[22] Filed: Jun. 14, 1989

[30] Foreign Application Priority Data

Jun. 22, 1988 [FR] France ................. 88 08362

[51] Int. Cl.⁵ .................. F16D 13/68; F16F 15/12
[52] U.S. Cl. .................. 464/63; 192/106.2; 464/68
[58] Field of Search .............. 192/106.2; 464/63, 66, 464/68

[56] References Cited

U.S. PATENT DOCUMENTS

| | | | |
|---|---|---|---|
| 4,212,380 | 7/1980 | Billet | 464/68 X |
| 4,433,770 | 2/1984 | Loizeau et al. | 464/68 X |
| 4,560,054 | 12/1985 | Kayanoki et al. | 464/68 X |
| 4,562,912 | 1/1986 | Kabayama | 464/68 X |
| 4,613,029 | 9/1986 | Beccaris | 464/68 X |
| 4,655,337 | 4/1987 | Carmillet et al. | 464/68 X |
| 4,663,983 | 5/1987 | Kobayashi et al. | 464/68 X |
| 4,685,896 | 8/1987 | Carmillet et al. | 464/68 |
| 4,698,045 | 10/1987 | Billet | 464/68 |
| 4,723,463 | 2/1988 | Reik et al. | 192/106.2 X |
| 4,726,454 | 2/1988 | Aiki | 464/68 X |
| 4,969,855 | 11/1990 | Graton et al. | 464/63 |

FOREIGN PATENT DOCUMENTS

| | | |
|---|---|---|
| 8611990 | 8/1986 | Fed. Rep. of Germany . |
| 2544426 | 10/1984 | France . |
| 2205145 | 11/1988 | United Kingdom . |

*Primary Examiner*—Daniel P. Stodola
*Attorney, Agent, or Firm*—Longacre & White

[57] ABSTRACT

A torsion damper assembly for an automotive clutch has a first part comprising a hub, a second part comprising two hub plates and a third part, the three parts being coaxial and rotatable independently of each other against springs acting over at least a predetermined portion of the angular displacement. The assembly has two sets of additional springs. These are mounted in recesses in the hub plates and in the hub, with their recesses facing each other in the region of a loose coupling defined between the hub and the hub plates. The additional springs associated with one hub plate are mounted in one of the recesses of that hub plate and of the hub, with a different circumferential clearance from the clearance with which the springs associated with the other hub plate are mounted in the corresponding recesses of that other hub plate and of the hub. The two hub plates are joined together for simultaneous rotation by structure which also act as phasing device for setting the loose coupling between the hub and each hub plate in its correct circumferential relationship.

6 Claims, 6 Drawing Sheets

THREE PART TORSIONAL DAMPER ASSEMBLY WITH FACING MEANS FOR SETTING CORRECT CIRCUMFERENTIAL RELATIONSHIP OF THE PARTS

FIELD OF THE INVENTION

The present invention relates generally to torsion damping assemblies, or torsion dampers, of the kind comprising three coaxial parts, mounted for relative rotation of each part relative to the others within the limits of a predetermined angular displacement, and against the action of resilient means adapted to act between the parts over at least a portion of such angular displacement, the said parts comprising: a first part comprising a hub; a second part comprising at least two hub plates, each of which is an annular member extending transversely around the hub, with loose coupling means, i.e. a coupling means permitting an initial relative rotational displacement before the coupled components rotate together, between the the annular member and the hub, for coupling the former with the latter; and a third part comprising at least one face plate, which, like the hub plates, and parallel with the latter, is an annular member extending transversely around the hub.

BACKGROUND OF THE INVENTION

In our co-pending French Patent Application No. 87 17072 (U.S. patent application Ser. No. 281,028 filed Dec. 7, 1988, now U.S. Pat. No. 4,969,855; United Kingdom Patent Application No. 88 28253.8) we have described a damper of the above kind, having additional circumferentially acting resilient means. These are of relatively low stiffness, separate from each other, with one being arranged between the hub and one of the hub plates, and the other being arranged between the hub and the other hub plate. These resilient means are mounted in slots or recesses formed in the outer periphery of the hub and in the inner periphery of the hub plates. An alternative arrangement of the loose coupling means is provided, such that, for a first circumferential direction of the relative angular displacement between the first and the second of the the parts of the assembly, only one of the hub plates operates initially, while in the opposite circumferential direction, while it is still true that only one of the hub plates operates, in this case it is the other one.

When the clearances in the loose coupling means are different, it is possible to obtain a summation of the effects of the two additional resilient means, resulting in a beneficial accumulated stiffness favourable to reduction in noise, which is caused especially when the clearance in the loose coupling means is taken up. During this phase, the hub plates are made to rotate together, by virtue of the resilient means of greater stiffness that acts between the second and third of the three parts of the assembly.

Such an arrangement does not however enable the stiffness of the additional resilient means to be readily overcome, since, in arranging the resilient means to carry out their principal function, one of the resilient means is such as to act mainly in one circumferential direction while the other is such as to act in the opposite circumferential direction.

SUMMARY OF THE INVENTION

An object of this invention is to overcome these disadvantages, and thus to provide an arrangement which, while allowing a summation of the stiffnesses of the resilient means acting between the first and second of the the parts of the assembly, yet leads to effective operation of the damper and a wide choice of stiffness for the various resilient means.

According to the invention, in a torsion damper assembly of the kind defined above, the the additional resilient means associated with one of the hub plates (the second resilient means, those mentioned in the opening paragraph of this specification being referred to as the first resilient means) are mounted in the slots of the the hub plate and of the hub with a clearance different from that with which the other additional resilient means (the third resilient means), associated with the other hub plate, are mounted in the corresponding slot of that other hub plate and of the hub, while a rotational coupling means, which is provided between the two hub plates so as to ensure that the hub plates rotate simultaneously, and which is quite separate from the loose coupling means, also constitutes a phasing means for setting the loose coupling means in correct circumferential relationship.

As a result of the invention, one of the second and third resilient means can be adapted for its principal function, while the other may be arranged to act only in order to add to the total stiffness of the resilient means.

It is thus possible to eliminate those noises referred to as "dead point" noises correctly, especially when the engine of the vehicle is running in a decelerating mode, while at the same time achieving a damping effect when the hub plates come into engagement with the hub.

It will be appreciated that the hub plates can be made different from each other only in respect of their slots or recesses in which the second and third resilient means are housed.

The hub plates may be fastened for rotation together by welding, riveting, or mechanical fastening. They may also be fastened using end pads or inserts arranged at the ends of the springs located between the second and third of the said parts of the assembly, with the hub plates having for example fingers which extend into hollow portions formed in the pads. In modified versions, a similar effect may be achieved using the springs themselves.

Advantage may be taken of the arrangement described in United Kingdom published Patent Application No. GB 2 205 145A (or the corresponding U.S. patent application Ser. No. 176,290 filed Mar. 31, 1988). To this end, it is sufficient to differentiate between the slots or recesses mentioned above, and to associate the resilient means with each hub plate.

It is of course possible to use the free space obtained between the two hub plates, mounting within that space at least one variable hysteresis ring, which is toothed at its inner periphery for meshing with the teeth of the hub, and by designing the loose coupling means in association with specific clamping or torque transmitting means of the assembly in such a way as to reduce the above mentioned noises still further.

The second and third resilient means may all be mounted without any clearance in the slots of the hub plates, and, in one of the hub plates, without clearance in the slot facing towards the hub, but with clearance in the slot formed in the hub which faces the other hub plate. In this case it can be of advantage to interpose between the two hub plates a spacer ring which separates the second and third resilient means, each with its associated friction means, from each other.

The various features and advantages of the invention will appear more clearly from the description which follows, which is given by way of example only and with reference to the accompanying drawings, which are as follows.

DESCRIPTION OF PREFERRED EMBODIMENTS

Figure 1:
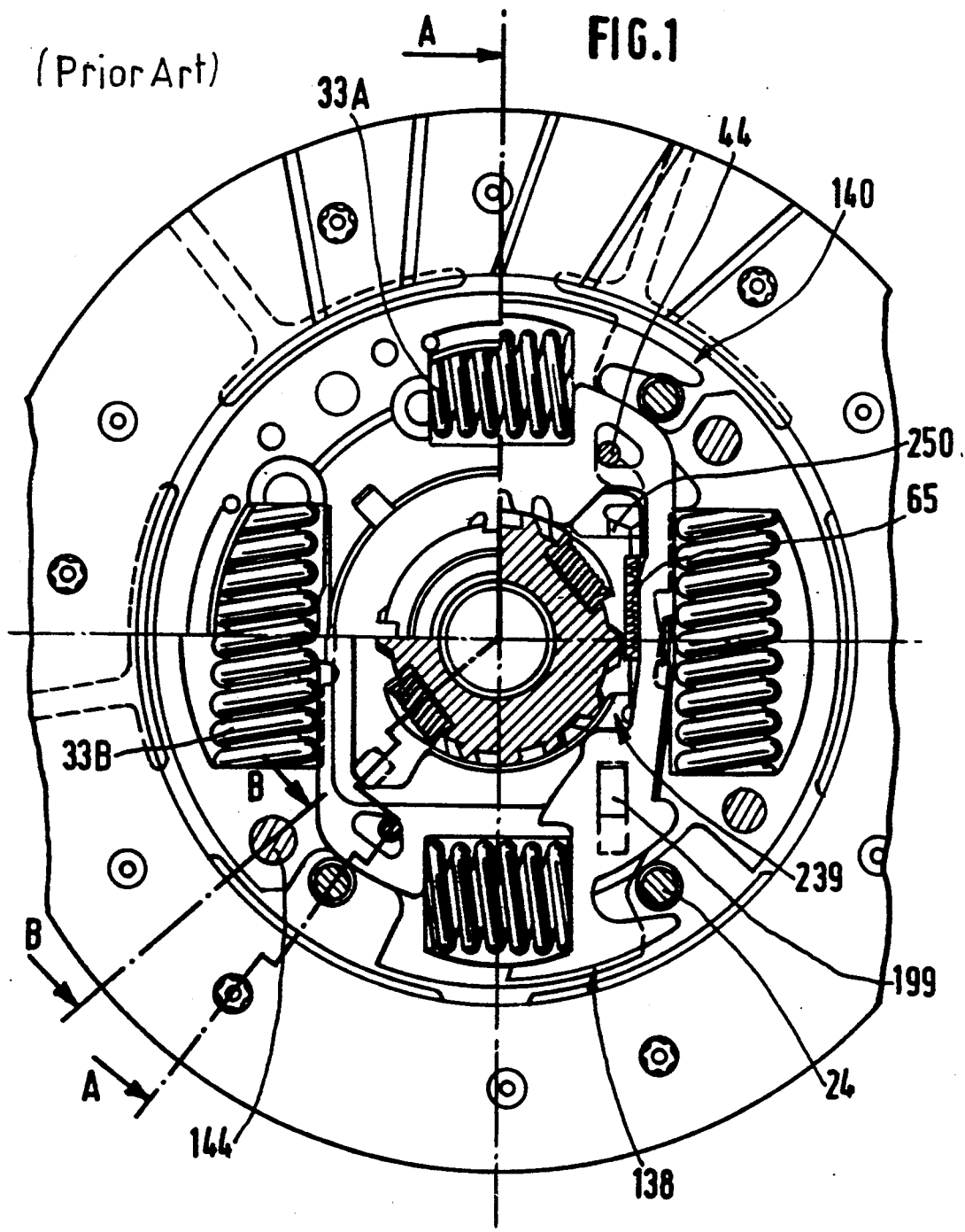
FIG. 1 is a front elevation, partially cut away, of a torsion damper assembly in the form of a moving plate clutch, of the kind disclosed in United Kingdom published Patent Application GB 2 205 145A.
Figure 2:
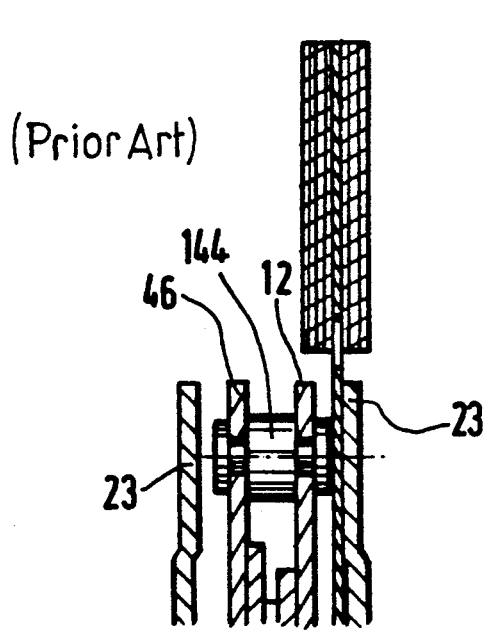
FIG. 2 is a scrap cross sectional view taken on the line B—B in FIG. 1.

In the embodiments now to be described, the torsion damper is part of a friction clutch assembly for an automotive vehicle. This assembly comprises at least three coaxial parts A, B, C, each mounted so as to be rotatable with respect to each of the others within the limits of a predetermined range of angular displacement.

The part A comprises a hub 10, while the part B comprises two hub plates axially displaced from each other, namely a damper plate 12 and a backing plate 46, each of which is an annular member extending transversely around the hub 10. Between the hub and each of the plates 12 and 46 there is provided a loose coupling means 13, that is to say a coupling means defining a clearance for initial relative rotational displacement between the plate 12 or 46 concerned and the hub and thereafter directly coupling the plate to the hub.

The part C includes at least one face plate 23. There are two face plates 23 in this example, each of which is an annular member extending transversely around the hub 10, but without being directly coupled to the latter.

The hub 10 is adapted to be coupled to the input shaft (not shown) of the gearbox for rotation therewith, while one of the face plates 23 is fastened to a clutch plate 26 carrying the clutch friction liners, through which the face plate is adapted to be coupled solidly with the engine shaft for rotation with the latter when the friction liners 26 are gripped between a pressure plate and a reaction plate (not shown) of the clutch.

In FIG. 1, the two face plates 23—more commonly referred to as "guide rings"—are identical, and are arranged with the damper plate 12 and backing plate 46 between them. The guide rings 23 are connected together by means of spacer bars 24 which extend through holes in the damper plate 12 and backing plate 46, with these holes providing a clearance for the spacer bars 24. The latter also serve to secure the clutch plate 26 to one of the guide rings 23.

The damper plate 12 and the backing plate 46 are substantially identical with each other, and are fixed at a distance from each other by means of spacers 144, which also secure the two plates 12 and 46 together for simultaneous rotation. The spacers 144 and the spacer bars 24 are on substantially the same pitch circle.

In a modification, one of the plates 12 or 46 may be provided with an axially extending flange, or other suitable projections, suitably secured to the other plate.

Friction means are provided between the backing plate 46 and the adjacent guide ring 23. These friction means comprise a thrust ring 72 which is coupled to the guide ring 23, for rotation with the latter, by means of fingers extending into corresponding holes formed in the guide ring 23 (FIG. 4), together with a resilient ring 74. In this example, the ring 74 is a Belleville ring. The resilient ring 74 bears on the guide ring 23 and urges the thrust ring 72 into contact with the backing plate 46.

Figure 4:
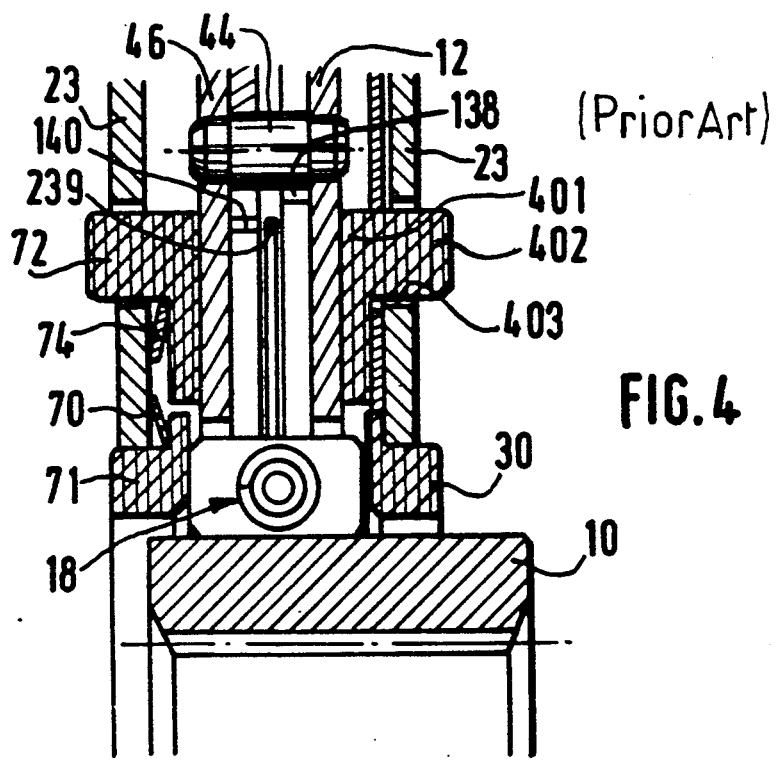
FIG. 4 is a scrap view on a larger scale, showing the central part of FIG. 3.

Similarly, a resiliently calibrated friction means is provided between the same guide ring 23, i.e. the left hand one in FIG. 4, and a radially enlarged portion 14 of the hub 10. This friction means is arranged radially inwardly of the friction means 72, 74 described above, and comprises a Belleville ring 70 which is less stiff than the Belleville ring 74 and which bears against an annular portion of a bearing 71 to bias the latter into contact with the enlarged hub portion 14. The bearing 71 has lugs extending into recesses in the guide ring 23 so as to couple it with the latter for rotation with it.

A friction ring 401 is provided between the other guide ring 23, the right hand one in FIG. 4, and the damper plate 12. This friction ring 401, which is substantially identical to the friction ring 72, has fingers 402 engaged in openings 403 of the corresponding guide ring 23. A bearing 30, substantially identical with the bearing 71, is interposed between this guide ring 23 and the radial enlargement 14 of the hub. The rings 74 and 70, due to the spacers 144, respectively cause the ring 401 to be gripped between the corresponding guide ring 23 and the damper plate 12, and the radial portion of the bearing 30 to be gripped between the other guide ring 23 and the hub portion 14.

Figure 5:
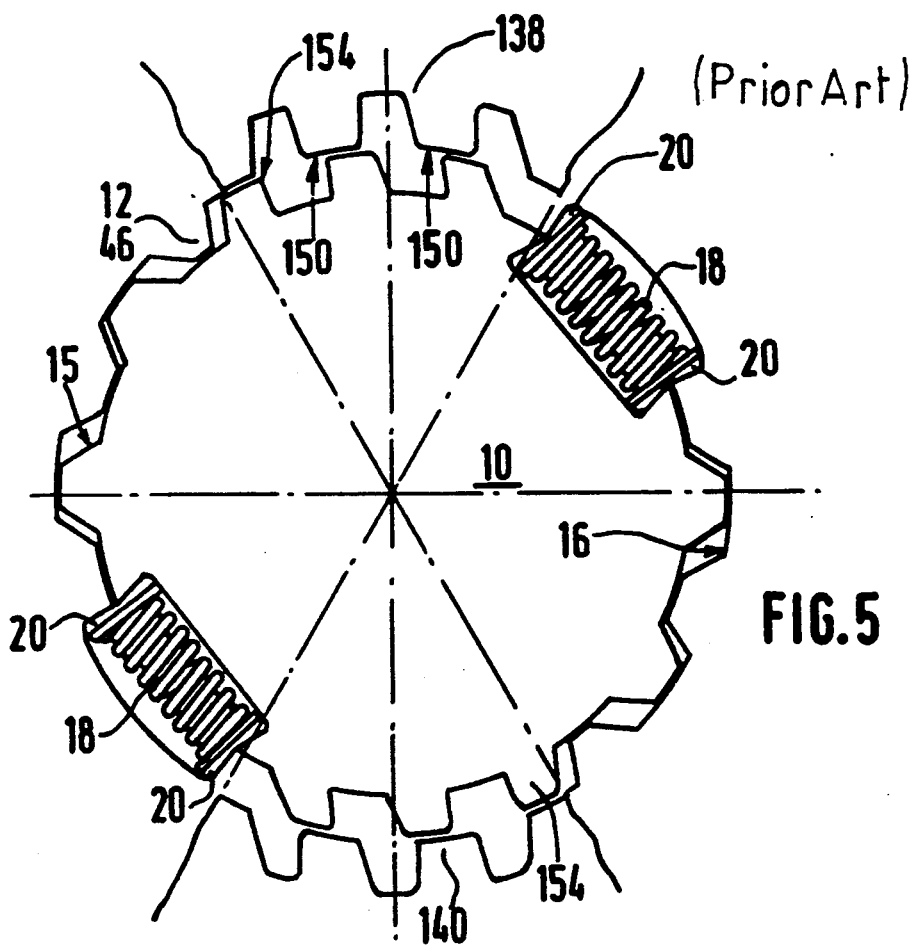
FIG. 5 is a simplified view of the sets of teeth on certain components of the same assembly.

The enlarged hub portion 14, which is formed on the outer periphery of the hub 10, has a set of teeth 15. Each of the hub plates 12 and 46 has another set of teeth 16 extending radially at their inner peripheries, and the loose coupling means 13 mentioned above comprises the teeth 15 cooperating, with a circumferential clearance, with the sets of teeth 16. Thus a tooth 15 of the hub extends, in the rest condition of the assembly, into a recess defining the clearance and formed facing it in the damper plate 12 and in the backing plate 46. Similarly a tooth 16 of the plate 12 or the plate 46 extends in the same rest condition into a groove defining a clearance and formed in the hub 10 facing that tooth 16. As can be seen from FIG. 5, the teeth 15 and 16 are trapezoidal in shape. The teeth 16 of the plates 12 and 46 are aligned by virtue of the spacers 144, thus ensuring that the loose coupling means are set in their correct circumferential relationship.

It will also be noted that in the region of the loose coupling means 13, additional resilient means 18 are provided. These are in the form of coil springs, mounted in slots formed facing each other, respectively in the inner periphery of the damper plate 12 and in that of the backing plate 46, and on the outer periphery of the hub 10. The ends of these springs 18 bear on the lateral edges of their housing slots through thrust inserts 20.

Figure 3:
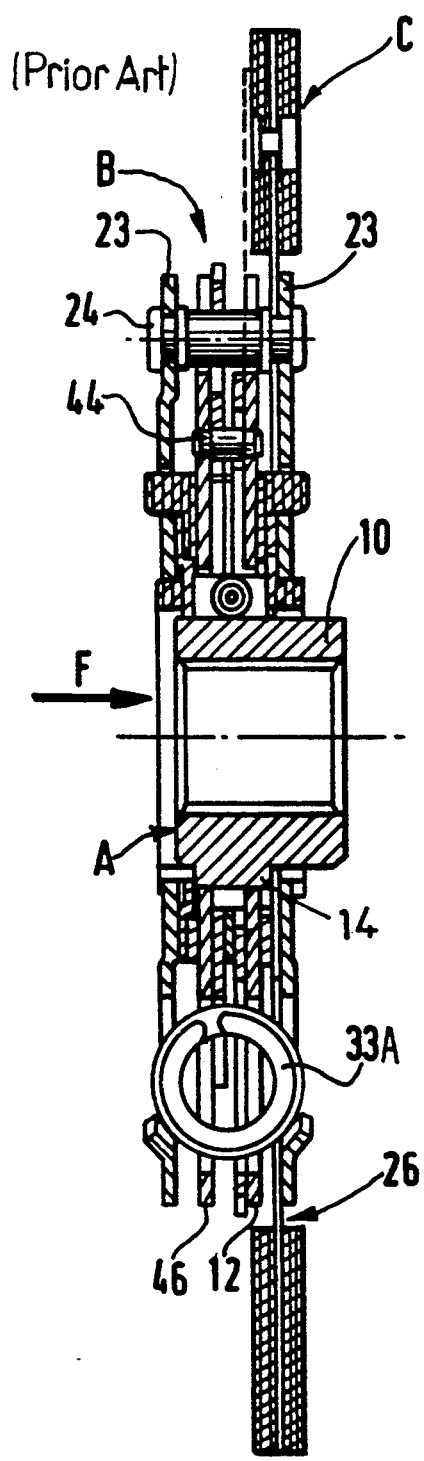
FIG. 3 is a cross section taken on the line A—A in FIG. 1.

The springs 18 act circumferentially between the hub 10 and the sub-assembly comprising the damper plate 12 and backing plate 46, and are less stiff than a set of first circumferentially acting resilient means 33A, 33B which couple the guide rings 23 to the damper and backing plates 12 and 46. The resilient means 33A and 33B are coil springs in this example, and are partly housed in through openings formed facing each other in the damper plate 12 and backing plate 46, and partly in further through openings formed in the guide rings 23 facing the first mentioned openings (see FIGS. 1 and 3).

In this example the springs 33A and 33B are mounted in their housing openings without any clearance. However, such a clearance may be provided for in respect of certain of the springs, in order to increase the number of steps of energy absorption in the damper.

As has already been described in United Kingdom published Patent Application GB 2 205 145A, an intermediate member is provided between two moveable plates 138 and 140, which are sensitive to centrifugal force. Thus, in FIG. 1, these moveable plates 138 and 140 are partly visible. They have openings 55 by which they are engaged on one of the springs 33A. These plates are also provided with through holes 23 through which the guide spacers 44 extend, and with projecting fingers 42.

The moveable plates 138 and 140 are connected to each other by a transmission member 239 pivoted on the moveable plates, in such a way that a displacement of one or other of the latter causes the transmission member 239 to move pivotally, with a displacement of the other moveable plate in the opposite direction. The transmission member 239 is radially fixed, being centred by means of axial flanges 145 on the radially enlarged portion 14 of the hub 10. Each of the two plates 138 and 140 has a continuous guide element 199 which extends transversely, as seen in FIG. 1, for engagement in a through opening of the other moveable plate 140 or 138 and for the guidance of the latter.

Figure 6:
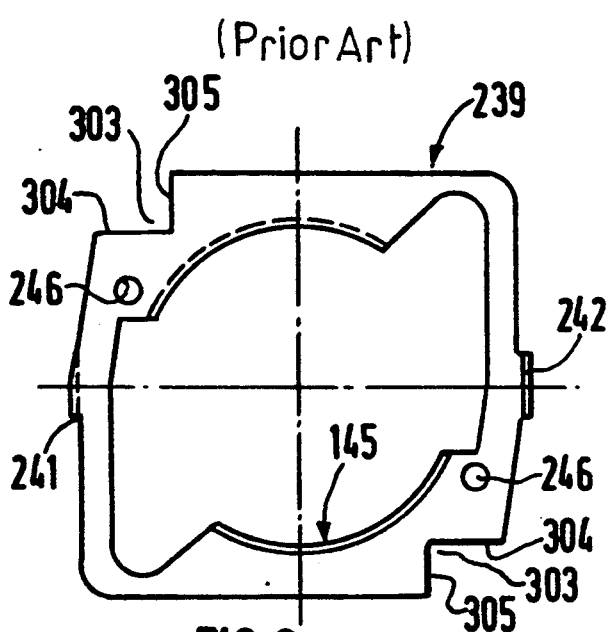
FIG. 6 is an elevation on a transmission member of the same assembly.

The member 239 has a rebate 303, FIG. 6, with two rectilinear edges 304 and 305 perpendicular to each other, to accommodate the guide elements 199. The transmission member 239 is inserted axially between the two plates 138 and 140, and is also provided with two holes 246, diametrically opposed to each other, in which are hooked resilient return means 65 (which in this example are coil springs), interposed between each plate 138, 140 and the member 239. One end of each return spring 65 is hooked into a hole 246, while its other end is hooked into a lug 250 of the associated plate 138 or 140. The springs 65 are parallel to each other, and only one of them can be seen in FIG. 1.

The moveable plates 138 and 140, and the transmission member 239, are actuated by means of diametrically opposed lugs 241 and 242 formed on the member 239 and extending into corresponding openings in the appropriate plate 138, 140. These lugs 241 and 242 extend generally axially, as seen in FIG. 6.

It will be recalled that beyond a predetermined rotational velocity, one of the plates 138, 140 is displaced radially against the action of the return spring 65, with the spacer 44 moving in the hole 43, and the moveable plate 138 or 140 causing the transmission member 239 to be rotated by means of the lugs 241, 242 engaging in the appropriate slot in the moveable plate concerned. The member 239 rotates pivotally and thus actuates the other moveable plate. The inclined teeth 150 of the plates 138 and 140 (FIG. 5) are then in engagement with the teeth 154 of the hub 10, in such a way that the moveable plates 138 and 140 become locked together with the hub 10. It will be noticed that the plates 138 and 140 bear upon the springs 33A through the appropriate edges of their openings 55.

Figure 7:
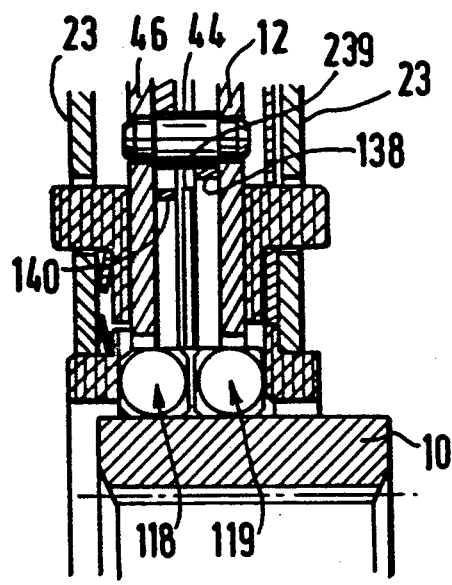
FIG. 7 is a view similar to FIG. 4, showing one embodiment of the present invention.
Figure 8:
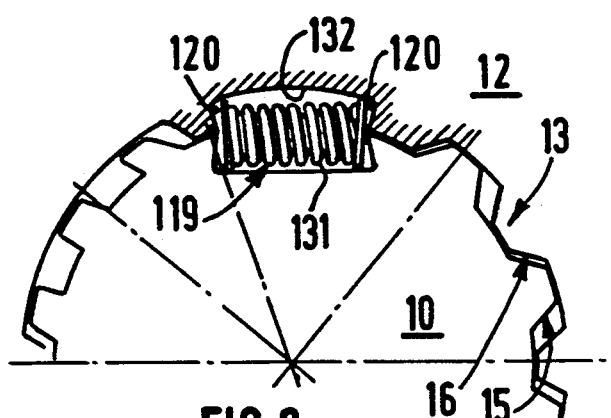
FIG. 8 is a scrap view similar to FIG. 5, showing the teeth of a damper plate in the assembly shown in FIG. 7.
Figure 9:
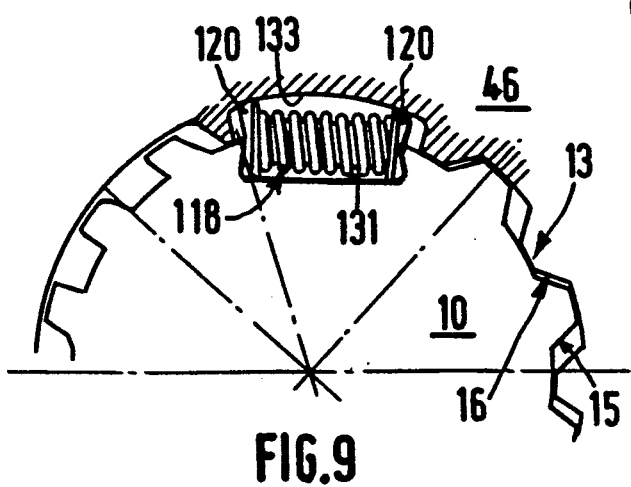
FIG. 9 is a scrap view similar to FIG. 5, showing the teeth of a backing plate in the assembly shown in FIG. 7.

Referring now to FIGS. 7 to 9, in this first embodiment of the invention, the hub plates 12 and 46 and the loose coupling means 13 are retained, but in place of a single set of resilient means 18, there are two distinct sets of circumferentially acting resilient means, 119 and 118. The first resilient means 119 are arranged between the hub 10 and the damper plate 12, and the second resilient means 118 between the hub 10 and the backing plate 46, in a manner to be described below. They act in combination with the means 144 that are provided between the plates 12 and 46, coupling the latter for rotation together. The means 144 constitute the phasing means for setting the elements of the loose coupling means 13 in their correct circumferential relationship. The teeth 15 of the hub 10 are used for this purpose, with the resilient means 118, 119 extending into zones which are axially offset from each other.

The resilient means 118 and 119 in this example are coil springs of low thickness, or, in a modification, blocks of resilient material, extending axially side by side in alignment with the backing plate 46 and with the damper plate 12, respectively.

Each spring 119 or 118 has, at each of its ends, a thrust insert 120 exerting a generally tangential thrust on the hub 10 and on the damper plate 12 and backing plate 46, respectively. In this example, the thrust inserts 120, which are preferably made of plastics material, are substantially identical with each other. Each insert 120 has a back or outer face of cranked shape, for cooperation, with or without a clearance, with the ends of the slots 131, 132, 133 respectively which are formed in the hub 10, the damper plate 12 and the backing plate 46. See FIGS. 8 and 9.

In this example two springs 119 and two springs 118, diametrically opposed to each other, are provided. The springs 119, FIG. 8, are mounted, by means of the thrust inserts 120, without clearance in the slots 131 facing the hub and in the slots 132 facing the damper plate 12. Similarly, the springs 118, FIG. 9, are mounted, again by means of their thrust inserts 120, without clearance in the slots 131 of the hub, but in this case they are mounted at each end with clearance in the slots 133 of the backing plate 46 which face the slots 131. The backing plate 46 differs from the damper plate 12 only in respect of its slots 133, the teeth 16 being preferably identical and aligned with each other so as to ensure good torque transmission. The slots 133 are therefore longer in the circumferential direction than the slots 132 and 131, which are of the same circumferential length as each other. It will be noted that the slot 131 is common to the slots 132 and 133, and that the slots 132 and 133 are axially aligned with each other.

It will be appreciated that the means 144, by which the plates 12 and 46 are fastened together for both simultaneous rotation and simultaneous translational movement, serve as phasing means for setting the sets of teeth 16 into the correct circumferential relationship with each other, and thus also for setting the loose coupling means 13.

Figure 10:
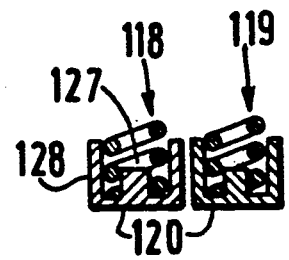
FIG. 10 is a developed sectional view of thrust insert members seen in FIGS. 8 and 9.

As can be seen from FIG. 10, each thrust insert 120 includes in combination a centring pin 127 on which the corresponding spring 118 or 119 is engaged, and, surrounding the spring, a peripheral retaining skirt 128, which in this example is divided into distinct elements. The thrust inserts 120 are spaced at a distance from each other.

Operation of the assembly described above takes place as follows. Above the above mentioned predetermined speed of rotation, the operation is identical with that of the prior art arrangement described earlier herein. By contrast, up to this predetermined speed, in a first phase the plates 12 and 46, rotating in unison with the guide rings 23 by virtue of the high stiffness of the springs 33A and 33B in comparison with that of the springs 118 and 119, are displaced with respect to the hub 10. This displacement takes place, firstly against the springs 119, and then, in a second stage, the springs 118 operate so as to add their effect to those of the springs 119.

The springs 118 may preferably be slightly stiffer than the springs 119. It will be appreciated that there is some freedom of choice for the stiffness of the springs 118, the principle function of the springs 119 being removal of "dead point" noises. The relative movement continues until the clearance in the loose coupling means 13 has been taken up, the noise caused principally by impact between the teeth 15 and 16 being diminished by virtue of the presence of the springs 118. Once the plates 12 and 46 have become coupled with the hub 10 for rotation with the latter, the springs 33A and 33B begin to be compressed.

It will be appreciated that the peripheral retaining skirts 128 of the thrust inserts 120 prevent any interference between the associated springs, despite the fact that the latter lie side by side.

Figure 11:
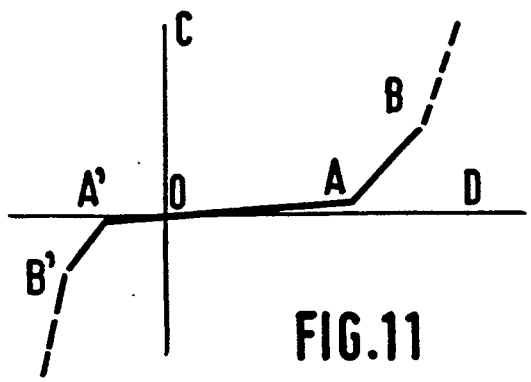
FIG. 11 shows a characteristic curve which is obtainable with the invention.

FIG. 11 shows the transmitted torque as ordinate, with displacement as abscissa. In forward motion, the line OA corresponds with the action of the springs 119, while the line AB corresponds to that of the springs 118 and 119 together. From the point B onwards, the springs 33A and 33B are operating. In the opposite direction, the line OA'B is obtained.

Figure 12:
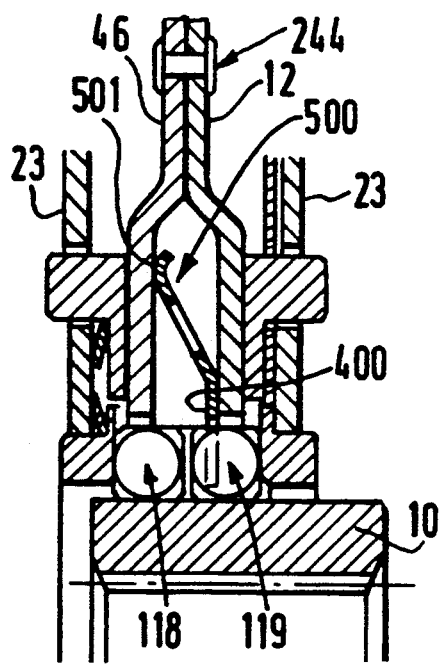
FIGS. 12 to 14 are views similar to FIG. 7, but showing further embodiments.

The provision of the moveable plates 138 and 140 and transmission member 239 is not obligatory. These members may be omitted if desired, but with the plates 12 and 46, the hub 10 and the springs 118 and 119 all being retained, as shown in FIG. 12. In this case, the damper plate 12 may be abutted on to the backing plate 46, to which it is fastened, for example by riveting as indicated at 244 in FIG. 12.

Alternatively, it is possible to use a securing means of the tenon and mortice type, or to fasten these elements together by welding. In a modification, the plates 12 and 46 may be secured for rotation together through the springs 33A and 33B themselves, either directly, or indirectly, for example by means of support pads, the plates 12 and 46 having fingers as described in U.S. Pat. No. 4,663,893, and these fingers being adapted to extend into hollow portions formed in the support pads.

In this connection, and in greater detail, the abutment of the plates 12 and 46 may be obtained through axially offset portions of these plates formed adjacent their outer peripheries as shown in FIG. 12. In a further modification this axial displacement may be confined to the local areas in which the rivets are inserted. Regardless of how the two plates 12 and 46 are fastened together, however, they are spaced axially from each other at their inner periphery.

It is possible to benefit from the free space present at the inner periphery of the plates 12 and 46, between the latter, by mounting a hysteresis ring 400 in this space. FIG. 12 shows the ring 400 connected integrally at its outer periphery with a resilient ring element 500 generally of the Belleville ring type. The ring 500 terminates in a circumferential beaded zone 501 through which it bears on the backing plate 46 and biasses the hysteresis ring 400 into contact with the damper plate 12. The ring 400 is mounted around the hub 10, and meshes with the latter, with a clearance which is smaller than the clearance provided between the hub 10 and the damper plate 12, but which is such as not to interfere with the springs 119. Due to the ring 500, a specific, independent gripping force is exerted. It will be appreciated that the gripping force exerted by the ring 400 is thus independent of that exerted by the separate, stiff Belleville ring 74 (FIG. 4), the force exerted by the ring 500 being smaller than that exerted by the ring 74.

Figure 15:
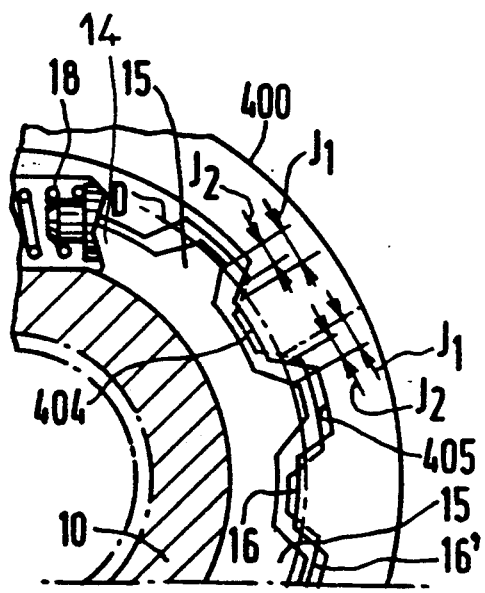
FIG. 15 is a partial cross sectional view showing the loose coupling means which are provided using hysteresis rings in the embodiments shown in FIGS. 12 to 14.

More precisely, and referring to FIG. 15, the ring 400 is provided with teeth 404 which are engaged in the slots defined between the hub teeth 15.

The total clearance $2.J_2$ which exists when the assembly is at rest (i.e. at point 0 on the curve in FIG. 11), between one tooth 404 and two consecutive teeth 15, is smaller than the clearance $2.J_1$ existing between the same consecutive teeth 15 and the corresponding teeth 16 of the plates 12 and 46. The ring 400 can thus act before the clearances $J_1$ are taken up, in such a way that it adds a friction effect as a result of the position which it then assumes, bearing frictionally on the zone of engagement of the teeth 15 against the teeth 16. Of course, two consecutive teeth 404 define one slot 405.

Figure 13:
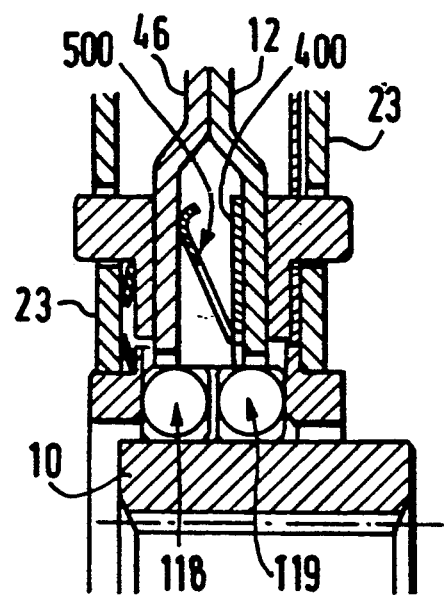

In the modified embodiment shown in FIG. 13, the ring 400 is a separate member from the Belleville ring 500, with the latter meshing without clearance in the ring 400.

Figure 14:
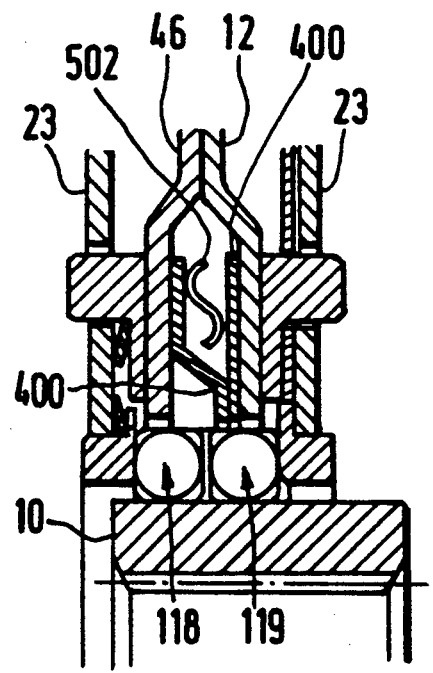

FIG. 14 shows another modification, in which there are two rings 400, one of which is of cranked form. The two rings 400 are maintained respectively in contact with the damper plate 12 and with the backing plate 46, by means of a corrugated spring 502 inserted between them. Reference is now made to the further embodiment shown in FIGS. 16 to 19. In this embodiment the springs 119 are mounted without clearance in the same way as in the embodiments of FIGS. 7 to 11, but in this case each of the springs 118 is mounted without clearance in the slots 233 of the backing plate 46, and with clearance at each of its ends in the slots 231 formed in the hub 10. In this case, a spacing ring 600 may be inserted between the damper plate and the backing plate. The slots 233 are then shorter in the circumferential direction than the slots 232 and 231, which are of the same circumferential length as each other.

Figure 16:
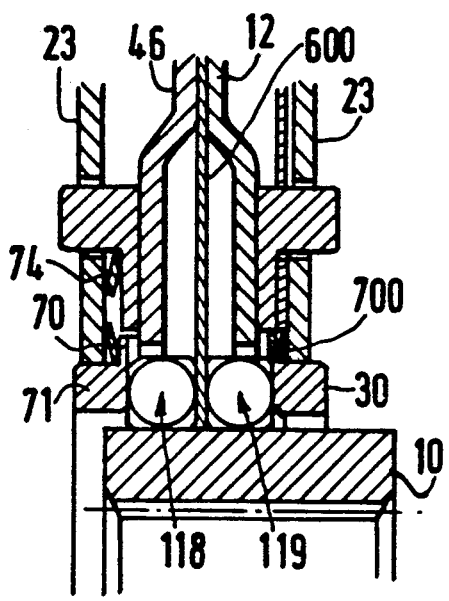
FIG. 16 is a view similar to FIG. 7, showing yet another embodiment.
Figure 18:
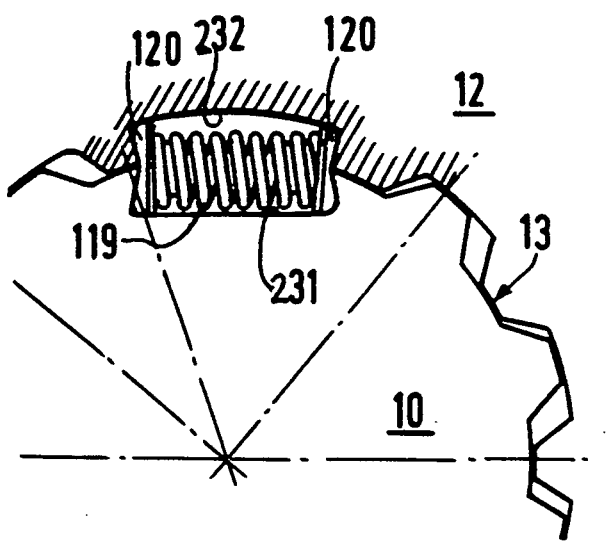
FIGS. 17, 18 and 19 are views similar to FIGS. 8 to 10 respectively, but relate to the embodiment shown in FIG. 16.
Figure 19:
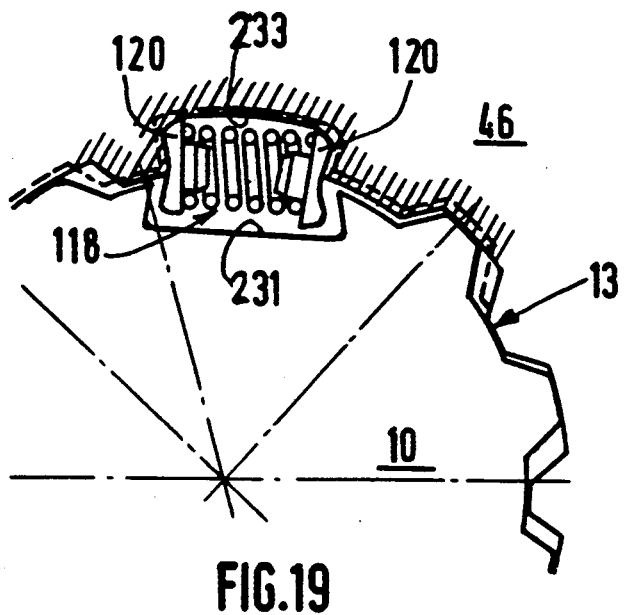
Figure 17:
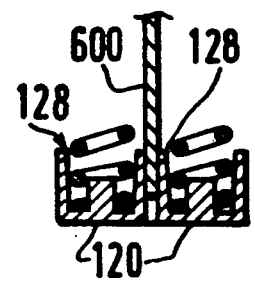

A resilient ring, for example a Belleville ring 700, may also be inserted between the bearing 30 and the adjacent guide ring 23. Instead of engaging against the radially enlarged portion 14 of the hub, the bearings 30 and 71 may, as is shown in FIG. 16, engage against the skirts 128 of the thrust inserts 120. These skirts may be made continuous. Additional friction can in this way be brought into play between the ring 600 and the peripheral skirt 128 of one of the thrust inserts 120. For example, supposing that the hub 10 is displaced with respect to the plates 12 and 46, these plates being assumed to be fixed, then in a first phase of operation the hub 10 actuates the thrust inserts 120 associated with the damper plate 12, so that the thrust inserts become displaced into contact with the ring 600 and the ring 30, while the thrust inserts 120 associated with the springs 118 are not compressed and are isolated by the ring 600 from the other springs 119. During a second phase, after the clearance between the thrust inserts 120 and the openings 231 has been taken up, the hub 10 moves the thrust inserts 120 and compresses the springs 118. Because of the action of the springs 70 and 700 and the ring 600, it will be appreciated that a separate friction effect, imposed respectively by the ring 700 or 70, is associated with each spring 119 or 118.

The present invention is of course not limited to the embodiments described. In particular, the thrust inserts 120 may be modified and may be of the same kind as those described in Utility Model No. 86.11990 of the Federal Republic of Germany. The ring 600 may be of bent or serpentine form, and may be fixed and linked with one of the plates 12 or 46 through the spacers 144. Similarly, the functions of the damper plate 12 and backing plate 46 may be reversed, and the number of springs 118, 119 may be increased.

In addition, the arrangement of the springs 118 and 119 is not necessarily symmetrical. The clearance may be made greater in a given circumferential direction, according to requirements, and in one direction it may even be zero.

It is also possible to offset the slots of the plates 12 and 46 angularly with respect to each other. For example, whereas in the drawings the slots in the hub plates 12, 46 correspond with each other, while the hub 10 has four slots regularly spaced circumferentially, it is possible to provide two slots in the hub 10 for mounting the associated springs of the first hub plate, with another two slots for the springs associated with the second hub plate.

In a modification, the radially enlarged portion 14 of the hub 10 may be divided into two portions, each of which is associated with a separate one of the hub plates. It is then possible to offset the sets of springs 118, 119 circumferentially without affecting the resistance of the enlarged portion 14. For example, with four springs grouped in pairs, it is possible to offset one set with respect to the other by 90°, with each hub portion having only two slots, instead of four as in the preceding examples, which can be advantageous in the case where a high torque is to be transmitted. Dividing the enlarged portion of the hub into two portions thus facilitates increasing the number of springs, and it becomes possible to use two sets of three springs.

In addition, as described in U.S. Pat. No. 4,698,045, only one of the plates 12 and 46 may be provided with teeth. In this case it is sufficient to increase the thickness of one of these plates. In order to provide good centring of the assembly, the hub 10 may be without teeth 15 facing the untoothed one of the two plates 12, 46, the hub then only having slots. As in the preceding description, phasing of the two plates 12 and 46 will be achieved by means of spacers, rivets, welding or other means for securing the damper and backing plates together for movement in rotation and translation.

The invention is also applicable to a double damped flywheel. In this case, the presence of the friction discs 26 is no longer necessary, and one of the guide rings 23 may be fixed to one of the first masses of the flywheel, for example the one which is secured to the engine crankshaft, while the hub 10 can be coupled to the second mass which constitutes the reaction plate of the clutch.

What is claimed is:

1. A torsion damper assembly comprising:
   a first part including a hub;
   a second part including at least a first hub plate and a second hub plate, each of said hub plates extending transversely around the hub, said first an second parts further comprising loose coupling means directly coupling the hub with each of said hub plates;
   a third part comprising at least one annular face plate disposed parallel with said hub plates, means directly coupling said third part with the hub being absent; and
   first resilient means engaged with said second and third parts,
   with the hub mounting said parts coaxially whereby each part can rotate relative to the others within the limits of a predetermined angular displacement and against the action of said first resilient means, said first resilient means being adapted to act between said parts over at least a portion of such angular displacement,
   the hub having hub slots and each hub plate having hub plate slots facing the hub slots adjacent to the loose coupling means, the assembly further comprising:
   second resilient means each mounted in a said hub slot and a said slot of the first hub plate;
   third resilient means, separate from said second resilient means and each mounted in a said hub slot and a said slot of the second hub plate, whereby said second and third resilient means act circumferentially between the hub and the first and second hub plates respectively; and
   rotational coupling means securing said hub plates together for simultaneous rotation, and being separate from the loose coupling means,
   wherein said second and third resilient means extend into zones which are axially offset from each other and wherein the slots of the hub and first hub plate define a clearance for the second resilient means and the slots of the hub and second hub plate define a clearance for the third resilient means, the clearances for the second and third resilient means being different from each other, said rotational coupling means constituting phasing means for setting the loose coupling means in correct circumferential relationship.

2. An assembly according to claim 1, wherein said second and third resilient means are mounted without clearance in the hub slots, and without clearance in the slots of one of the hub plates, and with clearance at both ends in the slots in the other hub plate.

3. An assembly according to claim 1, wherein said second and third resilient means are mounted without clearance in the hub plate slots, one of them being mounted in the hub without clearance and the other being mounted in the hub with clearance at both ends.

4. An assembly according to claim 1, wherein the first and second hub plates are spaced axially from each other at their respective inner periphery, thrust inserts are interposed between the ends of each of said second and third resilient means and the corresponding edges of said hub and hub plate slots, each thrust insert having a peripheral retaining skirt extending around the corresponding resilient means, a friction ring interposed axially between each of said face plates of the third part of the assembly and the hub, and a further resilient element axially biassing the friction ring into contact with the adjacent peripheral skirts of the thrust inserts between the frictional spacing ring and the corresponding friction ring.

5. An assembly according to claim 1, wherein the loose coupling means coupling the hub with the first and second hub plates respectively comprises a set of the teeth of the hub cooperating, with a circumferential clearance, with a set of teeth of the first and second hub plates respectively, wherein at least one friction ring is mounted axially between the hub plates, said one friction ring having teeth for meshing with the teeth of the hub to constitute a further loose coupling means, having a clearance smaller than the clearances of said loose coupling means and wherein a resilient element is mounted axially between said hub plates, which are fastened together by the rotational coupling means, said resilient means biassing said friction ring in contact with one of said hub plates.

6. An assembly according to claim 1, wherein the first and second hub plates are spaced axially from each other at their inner periphery, thrust inserts are interposed between the ends of each of said second and third resilient means and the corresponding edges of said hub and hub plate slots, each thrust insert having a peripheral retaining skirt extending around the corresponding resilient means, a friction ring interposed axially between each of said face plates of the third part of the assembly and the hub, a further resilient element axially biassing the friction ring into contact with the adjacent peripheral skirts of the thrust inserts between the frictional spacing ring and the corresponding friction ring, and a spacing ring inserted between the first and second hub plates and interposed between the peripheral skirts of the inserts associated with the second and third resilient means respectively.

* * * * *